US011262466B2

(12) United States Patent
Ishiyama (10) Patent No.: US 11,262,466 B2
(45) Date of Patent: Mar. 1, 2022

(54) METHOD AND SYSTEM FOR SEISMIC ACQUISITION USING A DISPERSED SOURCE ARRAY AND SPECTRALLY NON-OVERLAPPING SOURCES

(71) Applicant: Abu Dhabi National Oil Company, Abu Dhabi (AE)

(72) Inventor: Tomohide Ishiyama, Abu Dhabi (AE)

(73) Assignee: Abu Dhabi National Oil Company, Abu Dhabi (AE)

( * ) Notice: Subject to any disclaimer, the term of this patent is extended or adjusted under 35 U.S.C. 154(b) by 457 days.

(21) Appl. No.: 16/505,764

(22) Filed: Jul. 9, 2019

(65) Prior Publication Data

US 2021/0011183 A1   Jan. 14, 2021

(51) Int. Cl.
  *G01V 1/00* (2006.01)
  *G01V 1/30* (2006.01)
(52) U.S. Cl.
  CPC .............. *G01V 1/003* (2013.01); *G01V 1/307* (2013.01); *G01V 2210/21* (2013.01); *G01V 2210/26* (2013.01)
(58) Field of Classification Search
  CPC .... G01V 1/003; G01V 1/307; G01V 2210/26; G01V 2210/21
  See application file for complete search history.

(56) References Cited

U.S. PATENT DOCUMENTS

| 3,885,225 | A  | * | 5/1975  | Anstey  | G01V 1/005 367/41 |
| 2014/0362659 | A1 | * | 12/2014 | Tsingas | G01V 1/005 367/14 |

OTHER PUBLICATIONS

Mahdad, et al. "Iterative method for the separation of blended seismic data: discussion on the algorithmic aspects", Geophysical Prospecting, 2012, 60, 782-801 (Year: 2012).*
Berkhout, "Blended acquisition with dispersed source arrays" Geophysics, vol. 77, No. 4 (Jul.-Aug. 2012); p. A19-A23 (Year: 2012).*
Ishiyama, Tomohide et al., Blended-Acquisition Encoding with Generalized Blending Operators: Signaturing with Temporally Amplitude-Modulated and Spatially Dispersed Source Array, Jan. 2018, 14 pages.
Berkhout, A.J., Changing the Mindset in Seismic Data Acquisition, The Leading Edge Jul. 2008, 11 pages.

(Continued)

*Primary Examiner* — Regis J Betsch
(74) *Attorney, Agent, or Firm* — Renner, Otto, Boisselle & Sklar, LLP (57) ABSTRACT

A method of seismic acquisition using a dispersed-source array (DSA) comprising two or more sources. The method comprises determining, for each of the two or more sources of the DSA, an individual spectrally-banded waveform. For each of the two or more sources, a primary waveform is formed by repeating the individual spectrally-banded waveform. For each of the two or more sources, a secondary waveform is formed based on the primary waveform. The secondary waveform is spectrally shifted relative to the primary waveform such that secondary waveforms of any two of the two or more sources are spectrally non-overlapping. The blending operator based on the secondary waveform of each of the two or more sources is provided to the DSA. The method also includes performing deblended-data reconstruction of acquired seismic data using one or more properties of the blending operators of the two or more sources.

15 Claims, 6 Drawing Sheets

(56) References Cited

OTHER PUBLICATIONS

Mahdad, Araz et al., Iterative Method for the Separation of Blended Seismic Data: Discussion on the Algorithmic Aspects, 1 page.
Doulgeris, Panagiotis et al. Separation of Blended Data by Iterative Estimation and Subtraction of Interference Noise, 5 pages.

* cited by examiner

METHOD AND SYSTEM FOR SEISMIC ACQUISITION USING A DISPERSED SOURCE ARRAY AND SPECTRALLY NON-OVERLAPPING SOURCES

TECHNICAL FIELD

The present patent application relates to seismic acquisition using a dispersed-source array (DSA). More specifically, the present patent application relates to using the DSA in conjunction with spectrally shifting waveforms (or wavefields). This is called temporally modulated and spatially dispersed source array (M-DSA) in this document.

BACKGROUND

Blended acquisition of seismic data includes continuous recording of seismic responses from incoherent shooting, the properties of which are specified by arbitrary spatial and temporal distribution of the sources and their shots involved in the blended-source array. This acquisition is encoded by the blending operators containing the shot locations, times, signatures, etc. for the blended-source array. A benefit of blended acquisition is the acquisition of a larger amount of data in a more economical way than is possible using traditional acquisition.

Blended acquisition has been used in, e.g., distance-separated simultaneous sweeping (DSSS); independent simultaneous sourcing (ISS); managed sources and spread (MSS). These conventional methods require certain constraints for encoding and in operations, such as large distance separation among shot locations and large time shifts among shot times in the blended-source array so that the shot-generated wavefields do not overlap spatially and temporally with each other (at least around the offset-time window of interest). Without these constraints, these methods cannot ensure successful deblended-data-reconstruction processing in difficult situations.

Therefore, a need exists to at least in part overcome the shortcomings of the conventional approaches.

SUMMARY

Spectrally shifted waveforms (also referred to as sweep wavetrains and wavefields) with no frequency overlap with each other allows for deblending by separating the shot-generated wavefields in the frequency domain. This enables more enhanced deblending performance and higher operational productivity with fewer encoding constraints and more operational flexibility compared to other methods. In additional to making the blended-acquisition encoding and operations significantly simpler and more robust, improved deblended-data-reconstruction processing can be obtained.

A method of seismic acquisition using a DSA comprising two or more sources is provided. The method comprises the step of determining, for each of the two or more sources of the DSA, an individual spectrally-banded waveform. The method comprises further the step of forming, for each of the two or more sources, a primary waveform by repeating the individual spectrally-banded waveform. The method comprises further the step of forming, for each of the two or more sources, a secondary waveform based on the primary waveform, wherein each of the secondary waveforms is spectrally shifted relative to the primary waveform such that the secondary waveforms of any two of the two or more sources are spectrally non-overlapping. The method comprises further the step of providing the blending operator based on the secondary waveform of each of the two or more sources to the DSA, such that the DSA emits wavefields based on the secondary waveforms. The method also includes acquiring seismic data from the emitted wavefields. The method also comprises the step of performing deblended-data reconstruction of acquired seismic data using one or more properties of the blending operators of the two or more sources. The method also comprises storing the deblended seismic data.

A system for seismic acquisition is also provided. The system comprises a DSA comprising two or more sources and a control subsystem. The control subsystem comprises circuitry configured to: determine, for each of the two or more sources of the DSA, an individual spectrally-banded waveform; form, for each of the two or more sources, a primary waveform by repeating the individual spectrally-banded waveform; form, for each of the two or more sources, a secondary waveform based on the primary waveform; and provide the blending operator based on the secondary waveform of each of the two or more sources to the DSA. Each of the secondary waveforms is spectrally shifted relative to the primary waveform such that the secondary waveforms of any two of the two or more sources are spectrally non-overlapping. The DSA is configured to: emit wavefields based on the secondary waveforms; and acquire seismic data from the emitted wavefields. The circuitry of the control subsystem is further configured to perform deblended-data reconstruction of the acquired seismic data based on one or more properties of the blending operators of the two or more sources and to store the deblended seismic data.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF DRAWINGS

The annexed drawings, which are not necessarily to scale, illustrate various aspects of the invention, similar reference numerals being used to indicate the same or similar parts in the various views.

DETAILED DESCRIPTION

Embodiments of the present invention are now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present invention provides a blended-acquisition method using temporally modulated and spatially dispersed source array, namely M-DSA, that may jointly use modulation in the time dimension and dispersed-source array in the space dimension.

DSA (a space dimension concept) utilizes a blended-source array consisting of different sources rather than traditional equal ones (e.g. several types of narrow-frequency-banded source instead of a certain type of broad-frequency-banded source). The frequency-banded sources are randomly distributed and emit spectrally banded wavefields at each shot in the DSA. This allows fairly straightforward deblending by filtering in the frequency domain.

Modulation is utilized in the time dimension. For a shot in the blended-source array, if the sweep wavetrain is exactly repeated, the discrete frequencies (i.e. frequency channels) are made according to the total time length. The sweep wavetrain is allocated at particular frequency channels, whereas any remaining channels are empty. The empty channels are assigned for other shots in the blended-source array, in which the sweep wavetrains are modulated in the time dimension. In this way, the sweep wavetrains are spectrally shifted in the frequency domain. There is thereby no overlap between sweep wavetrains in the frequency domain. This allows for deblending by physically separating the shot-generated wavefields in the frequency domain.

M-DSA is a blended-acquisition method that may jointly use the above concepts (i.e. modulation in the time dimension and DSA in the space dimension).

Figure 1:
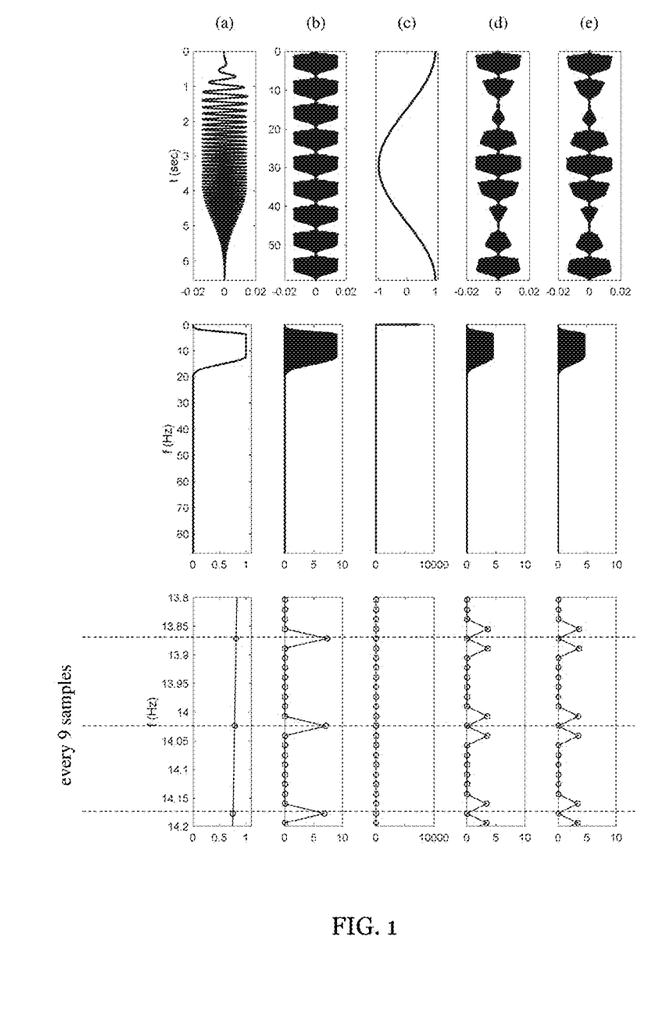
FIG. 1 shows an exemplary M-DSA blending operator in the time domain and the frequency domain, with the top row in the time domain, the middle row in the frequency domain, and the bottom row showing zoomed-in plots of the middle row. Column (a) shows the original sweep wavetrain; column (b) shows the repeated signature; column (c) shows the modulation carrier; column (d) shows the modulated signature; column (e) shows the consequent blending operator.

FIG. 1 shows an exemplary M-DSA blending operator, with the top row in the time domain, the middle row in the frequency domain, and the bottom row showing zoomed-in plots of the middle row. Column (a) shows the original sweep wavetrain; column (b) shows the repeated signature; column (c) shows the modulation carrier; column (d) shows the modulated signature; column (e) shows the consequent blending operator.

FIG. 1 illustrates how to apply M-DSA, thus how to design M-DSA operators. In the exemplary narrow-frequency-banded shot out of n shots in the DSA shown in FIG. 1, column (a), the signature is encoded in FIG. 1, column (b) by repeating the original frequency-banded sweep wavetrain l=2n−1 times, followed by multiplying modulation carriers (shown in FIG. 1, column (d)). The modulation carrier is a long-wavelength cosine function with its phase of $2\pi m_i \Delta f t$ ($m_i=0,1, \ldots, m$), where the integer $1<m<l/2$ is the number of modulation cycles, and $\Delta f$ is the frequency sampling interval according to the total time length (FIG. 1, column (c)).

The l-times repeated signature ($m_i=0$) is allocated in every l frequency samples (FIG. 1, column (b)), and the modulated signatures ($m_i=1, \ldots, m$) are assigned at frequency channels $+/-m_i\Delta f$ from those of the repeated signature (FIG. 1, column (d), $m_i=1$ in this example). The amplitudes of modulated signatures are halved due to the cosine effects. As shown in FIG. 1, column (e), any additional blending properties, such as time dithering and phasing, can be encoded as well. In this example, an original low-frequency-banded source of 1/4-12/20 Hz with a typical sweep length of 6.5 s; n=5; l=9; m=4 was used having a consequent sweep length of 58.5 s. In addition, a small time shift less than 0.256 s was applied.

It should be noted that FIG. 1 is an example and is not intended to limit this invention to the specific embodiments or parameters so described.

Figure 2A:
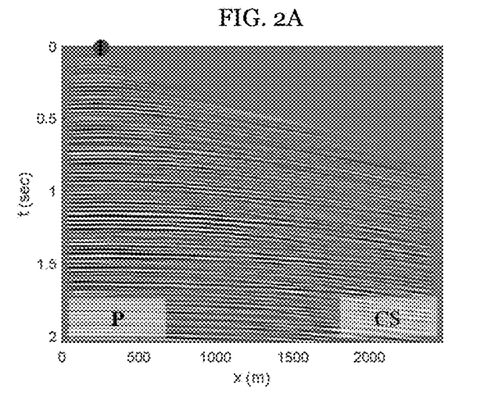
FIGS. 2A and 2B show reference data in the common-source (CS) and the common-receiver (CR) domain respectively.
Figure 2B:
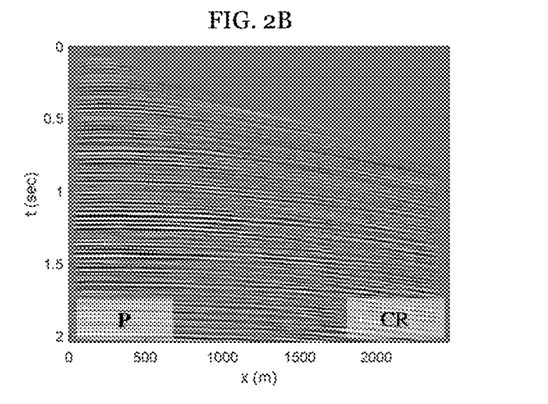
Figure 3A:
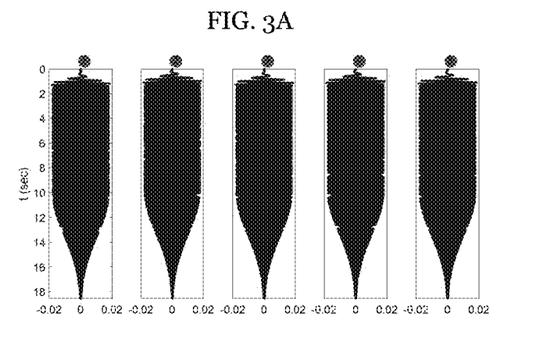
FIG. 3A shows, for a conventional blending method, blending operators in the time domain for each shot in the blended-source array.
Figure 3B:
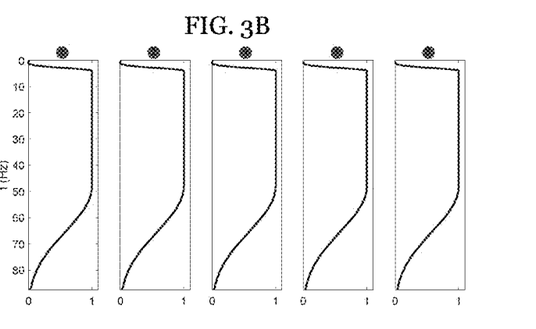
FIG. 3B shows, for a conventional blending method, blending operators in the frequency domain for each shot in the blended-source array.
Figure 3C:
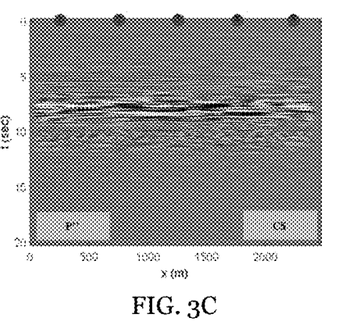
FIG. 3C shows blended data for a conventional blending method.
Figure 3D:
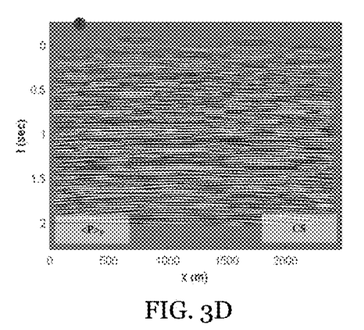
FIG. 3D shows pseudo-deblended data (i.e. data after deconvolution of the blending operators in the 1st iteration of deblended-data-reconstruction processing) in the CS domain for a conventional blending method.
Figure 3E:
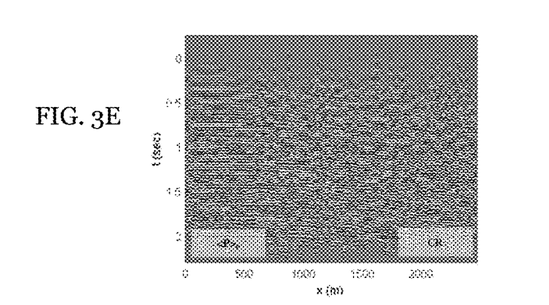
FIG. 3E shows pseudo-deblended data in the CR domain for a conventional blending method.
Figure 4A:
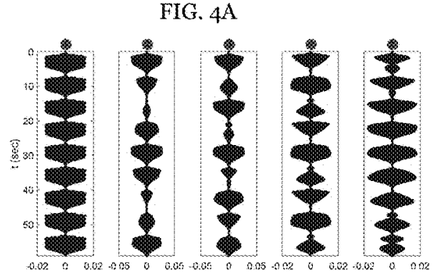
FIG. 4A shows, for M-DSA, blending operators in the time domain for each shot in the DSA array.
Figure 4B:
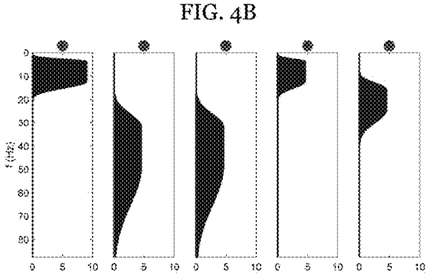
FIG. 4B shows, for M-DSA, blending operators in the frequency domain for each shot in the DSA array.
Figure 4C:
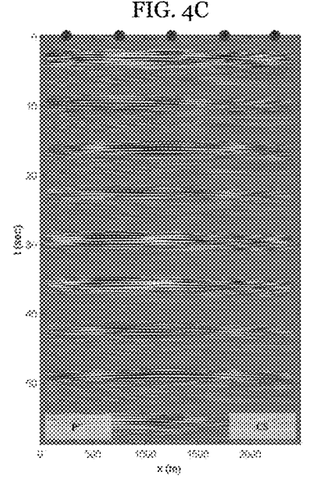
FIG. 4C shows blended data for M-DSA.
Figure 4D:
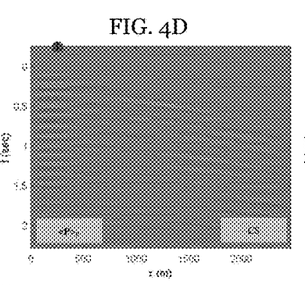
FIG. 4D shows pseudo-deblended data in the CS domain for M-DSA.
Figure 4E:
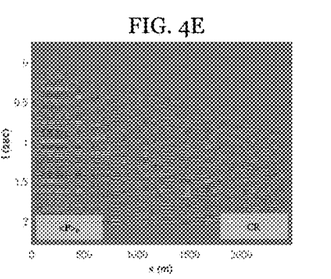
FIG. 4E shows pseudo-deblended data in the CR domain for M-DSA.
Figure 4F:
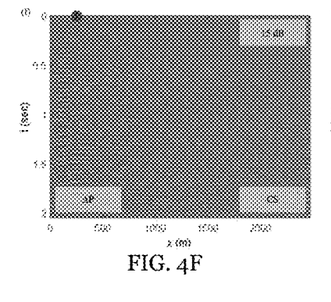
FIG. 4F shows the difference between FIGS. 2A and 4G with the signal-to-noise ratio (S/N) value.
Figure 4G:
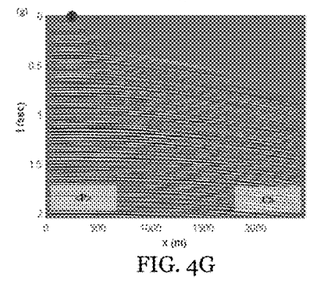
FIG. 4G shows deblended data after 100 iterations of deblended-data-reconstruction processing in the CS domain.
Figure 4H:
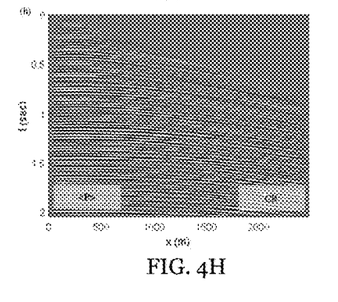
FIG. 4H shows deblended data after 100 iterations of deblended-data-reconstruction processing in the CR domain.
Figure 4I:
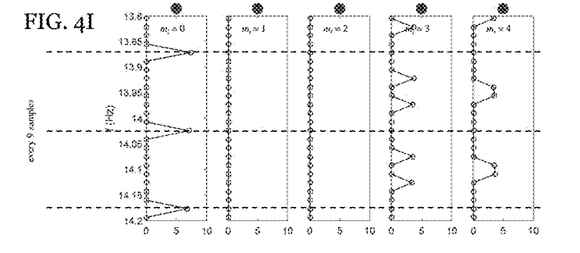
FIG. 4I shows zoomed-in plots of FIG. 4B.

FIGS. 2 to 4 show examples comparing a conventional method and M-DSA. The dark circle located at the top indicates the source and its shot location in each particular section.

FIG. 2 shows reference data that is existing real data and regarded as traditional unblended data, P. FIGS. 2A and 2B, respectively, show the reference data in the CS and CR domain.

The blended data, P''', were then numerically synthesized with the blending operators for each case. In the synthesizing process, the number of sources in the blended-source array was five. The shots were signatured by linear upsweep wavetrains. Time dithering was applied with the maximum random time shift of 0.256 s. This assumes a very difficult situation with a large number of sources, small separation of distance offsets and time shifts among shots in the blended-source array. This is followed by deblended-data reconstruction using an iterative optimization scheme of sparse inversion, outputting the deblended data, <P>. Both of the data, P and <P>, can be compared and evaluated based on the S/N, P/(P−<P>).

FIG. 3 shows an example of a conventional blending method. FIGS. 3A and 3B show blending operators in the time and frequency domain for each shot in the blended-source array. FIG. 3C shows blended data. FIGS. 3D and 3E show pseudo-deblended data in the CS and CR domain, respectively.

In FIG. 3, a broad-frequency-banded source was used with a typical sweep length of 18.5 s. FIGS. 3D and 3E show the pseudo-deblended data, <P>$_P$, where the shot-generated wavefields are severely overlapped and interfered with each other even after the pseudo-deblending. In this scenario, it failed to achieve deblending. This is because the randomly scattered blended noise dominates and surpasses the blended signal; consequently, the iterative optimization scheme does not converge in stopping criteria in the sparse inversion algorithm.

FIG. 4 shows an example of M-DSA. FIGS. 4A and 4B show blending operators in the time and frequency domain for each shot in the DSA. FIG. 4C shows blended data. FIGS. 4D and 4E show pseudo-deblended data in the CS and CR domain, respectively. FIG. 4F shows the difference between FIGS. 2A and 4G with the S/N value. FIGS. 4G and 4H show deblended data after 100 iterations in the CS and CR domain, respectively. FIG. 4I shows zoomed-in plots of FIG. 4B. In FIGS. 4A-I, three types of frequency-banded sources are used: a low frequency source of 1/4-12/20 Hz; a mid frequency source of 8/16-24/40 Hz; a high frequency source of 16/32-48/96 Hz. The repeated signature ($m_i=0$) is allocated in every 9 frequency samples, and the modulated signatures ($m_i=1, \ldots, 4$) are assigned at frequency channels $+/-m_i\Delta f$ from those of the repeated one.

In FIG. 4 A-I, the original sweep length was 6.5 s each with its own sweep rate, thereby the consequent sweep length was 58.5 s. FIGS. 4D and 4E show that pseudo-deblended data, <P>$_P$, where the shot-generated wavefields are demodulated, designatured and frequency-banded, corresponding to results of filtering and physically separating frequency channels in the frequency domain. The wavefields are almost perfectly separated just after the pseudo-deblending. The deblending problem is then switched to a data-reconstruction problem. This problem is solved by an iterative optimization scheme of sparse inversion in general. FIGS. 4G and 4H show the deblended data, <P>, after 100 iterations. FIG. 4F shows the residual between unblended and deblended data, $\Delta P=P-<P>$, with the S/N of 15 dB up. The results show that the temporal spectra are entirely recovered and balanced after iterations, and the deblended data are successfully reconstructed.

As shown in the above examples, M-DSA successfully reconstructed deblended data even for a very difficult situation with a large number of sources, small separation of distance offsets and time shifts among shots in the DSA, whereas conventional methods failed to achieve it.

There are several advantageous features of M-DSA. First, M-DSA requires only simple signaturing (i.e. frequency banding and modulating) in the time dimension at each shot in the DSA (FIG. 1). This could even render any other blending properties unnecessary. Further, conventional constraints, such as distance separation among shot locations and time shifts among shot times in the DSA, may also not be required. There may also not be any limitation on the number of sources in the DSA in order to secure successful deblending.

Second, M-DSA requires no constraints in the space dimension, thereby allowing non-uniform sampling and non-patterned shooting along the space dimension. This allows for the use of distributed, decentralized, and dispersed source array in which a swarm of the sources is independently, simultaneously, and flexibly operational in a decentralized manner with no attempt to synchronize their activity. This may be used to promote robotized acquisition.

Third, M-DSA achieves higher operational productivity than conventional methods. If five sources are used in the DSA in an independent sourcing area, the consequent sweep length (e.g. 58.5 s with M-DSA) would be 3-times longer than that of a broad-frequency-banded source (e.g. 18.5 s with a conventional method). However, the number of shot points with M-DSA would be five-times smaller than that of the conventional method, because of the blending fold in the independent sourcing area. Consequently, the productivity of M-DSA is expected to be 5/3-times higher than that of the conventional method.

As a conclusion, M-DSA attains more enhanced deblending performance and higher operational productivity with fewer encoding constraints and more operational flexibility compared to other methods. M-DSA makes the blended-acquisition encoding and operations significantly simpler and more robust, as well as for the deblended-data-reconstruction processing.

Figure 5:
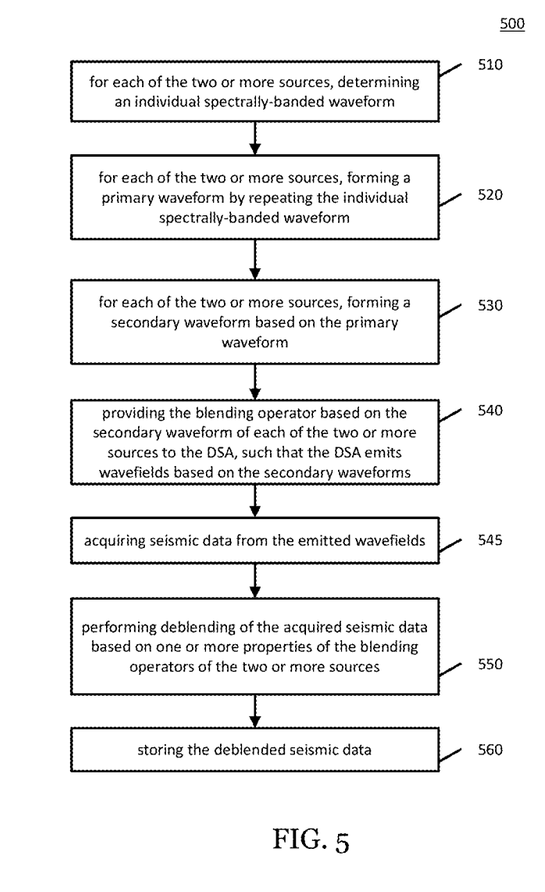
FIG. 5 shows an exemplary method of seismic acquisition using a DSA comprising two or more sources.

FIG. 5 shows a flow diagram of a method 500 of seismic acquisition using a DSA comprising two or more sources. In step 510, for each of the two or more sources of the DSA, an individual spectrally-banded waveform is determined. In step 520, for each of the two or more sources, a primary waveform is formed by repeating the individual spectrally-banded waveform. In step 530, for each of the two or more sources, a secondary waveform is formed based on the primary waveform. Each of the secondary waveforms is spectrally shifted relative to the primary waveform, such that secondary waveforms of any two of the two or more sources are spectrally non-overlapping.

In step 540, the blending operator based on the secondary waveform of each of the two or more sources is provided to the DSA, such that the DSA emits wavefields based on the secondary waveforms. In step 545, seismic data from the emitted wavefields is acquired (for example, using the M-DSA). In step 550, deblended-data reconstruction of the acquired seismic data is performed using one or more properties of the blending operators of the two or more sources. In step 560, the deblended seismic data is stored.

It is noted that the method 500 may be supplemented by incorporating any elements, aspects or details described herein, also in the context of any apparatus disclosed herein. Such elements, aspects or details may be incorporated into the method 500 individually or in any combination.

Figure 6:
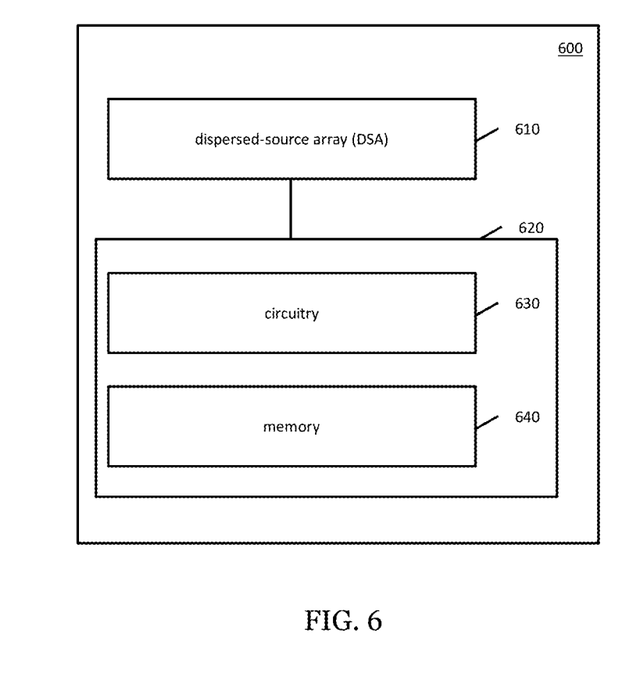
FIG. 6 shows an exemplary system for seismic acquisition.

FIG. 6 shows schematically a system 600 for seismic acquisition. The system 600 comprises a DSA 610. The DSA 610 may comprise any elements, aspects or details described herein. The system 600 comprises further a control subsystem 620 comprising circuitry 630 and memory 640 (e.g. a non-transitory computer readable medium). The control subsystem 620 may be connected (e.g. electrically) to the DSA. The control subsystem 620 provides control information to the DSA such as control signals, waveforms, data or the like.

The circuitry of the control subsystem 620 may comprise any suitable device, such as a processor (e.g. CPU), programmable circuit, integrated circuit, memory and I/O circuits, an application specific integrated circuit, microcontroller, complex programmable logic device, other programmable circuits, or the like. The memory 640 may comprise a non-transitory computer readable medium, such as random access memory (RAM), a read-only memory (ROM), an erasable programmable read-only memory (EPROM or Flash memory), or any other suitable medium. Instructions for performing the method described above may be stored in the non-transitory computer readable medium 640 and executed by the circuitry 630 of the control subsystem 620. The circuitry 630 may be communicatively coupled to the computer readable medium 640 and a network interface through a system bus, mother board, or using any other suitable structure known in the art.

The circuitry 630 of the control subsystem 620 may be described in terms of a spectrally-banded waveform module, a primary waveform module, a secondary waveform module, a blending operator module, an acquisition module, and a deblended-data-reconstruction processing module. The spectrally-banded waveform module is configured to determine an individual spectrally-banded waveform for each of the two or more sources comprised in the DSA 610. The primary waveform module is configured to form, for each of the two or more sources of the DSA 610, a primary waveform by repeating the individual spectrally-banded waveform. The secondary waveform module is configured to form, for each of the two or more sources, a secondary waveform based on the primary waveform. The secondary waveform is spectrally shifted relative to the primary waveform such that secondary waveforms of any two of the two or more sources are spectrally non-overlapping. The blending operator based on the secondary waveform is provided by the control subsystem 620 to the DSA 610 such that a seismic vibration corresponding to the waveform may be generated by individual sources (e.g. vibrators) of the DSA. The deblended-data-reconstruction processing module is configured to perform deblended-data reconstruction of acquired seismic data using one or more properties of the blending operators of the two or more sources.

It is noted that the apparatus 600 may be supplemented by incorporating any elements, aspects or details described herein, also in the context of any method disclosed herein. Such elements, aspects or details may be incorporated into the apparatus 600 individually or in any combination.

For further information relating to the subject invention, reference may be had to T. Ishiyama, M. Ali, G. Blacquiere and S. Nakayama, Blended-acquisition encoding with generalized blending operators: signaturing with temporally amplitude-modulated and spatially dispersed source array, Conference Paper, Abu Dhabi International Petroleum Exhibition & Conference, 12-15 November, Abu Dhabi, UAE, SPE-192777-MS, Document ID SPE-192777-MS, November 2018, which is hereby incorporated herein by reference.

The invention claimed is:

1. A method of seismic acquisition using a dispersed-source array (DSA) comprising two or more sources, the method comprising the steps of:
   a. for each of the two or more sources of the DSA, determining an individual spectrally-banded waveform;
   b. for each of the two or more sources, forming a primary waveform by repeating the individual spectrally-banded waveform;
   c. for each of the two or more sources, forming a secondary waveform based on the primary waveform, wherein each of the secondary waveforms is spectrally shifted relative to the primary waveform, such that the secondary waveforms of any two of the two or more sources are spectrally non-overlapping;
   d. providing the blending operator based on the secondary waveform of each of the two or more sources to the DSA, such that the DSA emits wavefields based on the secondary waveforms;
   e. acquiring seismic data from the emitted wavefields;
   f. performing deblended-data reconstruction of the acquired seismic data based on one or more properties of the blending operators of the two or more sources; and
   g. store the deblended seismic data.

2. The method of claim 1, wherein the two or more sources are narrow-frequency-banded vibration sources.

3. The method of claim 1, wherein a number of repetitions of the individual spectrally-banded waveform used to form the primary waveform is dependent on a number of the two or more sources.

4. The method of claim 1, wherein the spectral shift comprises both shifts towards a lower frequency and a higher frequency for one of the two or more sources.

5. The method of claim 1, wherein forming the secondary waveform comprises temporal multiplying the first waveform by a modulation carrier.

6. The method of claim 5, wherein the modulation carrier is a function having a narrow-frequency-banded spectrum or a mono-frequency spectrum.

7. The method of claim 6, wherein the modulation carrier is a periodic function having a number of periods over a time length of the primary waveform, wherein the number of periods is different for each individual source of the two or more sources.

8. The method of claim 7, wherein a magnitude of the spectral shift of the secondary waveform relative to the primary waveform is dependent on the number of periods of the modulation carrier.

9. The method of claim 1, wherein forming the secondary waveform further comprises applying a time dithering and/or phasing to the primary waveform.

10. The method of claim 1, wherein performing the deblended-data reconstruction of the acquired seismic data comprises an iterative optimization scheme of sparse inversion.

11. The method of claim 1, wherein performing the deblending of the acquired seismic data comprises a filtering and/or separating frequency channels in a frequency domain.

12. The method of claim 1, wherein the individual blending operator encodes the shot location, the shot time, and the shot signature.

13. The method of claim 1, wherein the spectrally-banded waveform and the primary waveform comprises a frequency-banded sweep wavetrain.

14. The method of claim 1, wherein the DSA is operated in a decentralized manner without a synchronization of the two or more sources.

15. A system for seismic acquisition comprising:
   a dispersed-source array (DSA) comprising two or more sources, a control subsystem comprising circuitry configured to:
   a. for each of the two or more sources of the DSA, determine an individual spectrally-banded waveform;
   b. for each of the two or more sources, form a primary waveform by repeating the individual spectrally-banded waveform;
   c. for each of the two or more sources, form a secondary waveform based on the primary waveform, wherein each of the secondary waveforms is spectrally shifted relative to the primary waveform, such that the secondary waveforms of the two or more sources are spectrally non-overlapping; and
   d. provide the blending operator based on the secondary waveform of each of the two or more sources to the DSA;

wherein the DSA is configured to:
  emit wavefields based on the provided blending operators; and
  acquire seismic data from the emitted wavefields; and
wherein the circuitry of the control subsystem is further configured to:
  perform deblended-data reconstruction of the acquired seismic data based on one or more properties of the blending operators of the two or more sources; and
  store the deblended seismic data.

* * * * *